United States Patent [19]

Bott

[11] Patent Number: 5,158,425

[45] Date of Patent: * Oct. 27, 1992

[54] VEHICLE ARTICLE CARRIER

[76] Inventor: John A. Bott, 931 Lakeshore Dr., Grosse Pointe Shores, Mich. 48236

[*] Notice: The portion of the term of this patent subsequent to Aug. 4, 2004 has been disclaimed.

[21] Appl. No.: 592,606

[22] Filed: Oct. 4, 1990

Related U.S. Application Data

[63] Continuation of Ser. No. 407,635, Sep. 15, 1989, abandoned, which is a continuation of Ser. No. 213,899, Jun. 30, 1988, Pat. No. 4,877,168, which is a continuation of Ser. No. 3,134, Jan. 14, 1987, Pat. No. 4,754,905, which is a continuation of Ser. No. 778,385, Sep. 20, 1985, Pat. No. 4,684,048.

[51] Int. Cl.$^5$ ............................................. B60R 9/04
[52] U.S. Cl. ................................. 224/321; 224/326
[58] Field of Search ............ 224/309, 321, 322, 324–327

[56] References Cited

U.S. PATENT DOCUMENTS

| | | | |
|---|---|---|---|
| Re. 26,538 | 3/1969 | Bott | 224/316 |
| Re. 26,539 | 3/1969 | Bott | 224/321 |
| Re. 32,583 | 1/1988 | Bott | 224/326 |
| D. 314,541 | 2/1991 | Bott . | |
| D. 317,744 | 6/1991 | Bott . | |
| 2,242,844 | 5/1941 | Baier et al. | 292/8 |
| 2,388,625 | 11/1945 | Wagenknecht | 248/503 |
| 3,330,454 | 7/1967 | Bott | 224/316 |
| 3,623,642 | 11/1971 | Stephen | 224/326 |
| 3,643,973 | 2/1972 | Bott | 410/101 |
| 4,015,760 | 4/1977 | Bott | 224/324 |
| 4,099,658 | 7/1978 | Bott | 224/326 |
| 4,106,680 | 8/1978 | Bott | 224/324 |
| 4,132,335 | 1/1979 | Ingram | 224/326 |
| 4,133,465 | 1/1979 | Bott | 224/324 |
| 4,146,198 | 3/1979 | Bott | 224/326 |
| 4,162,755 | 7/1979 | Bott | 224/326 |
| 4,182,471 | 1/1980 | Bott | 224/326 |
| 4,222,508 | 9/1980 | Bott | 224/324 |

(List continued on next page.)

FOREIGN PATENT DOCUMENTS 2832298 1/1980 Fed. Rep. of Germany ...... 224/316
2910895 10/1980 Fed. Rep. of Germany ...... 224/316

OTHER PUBLICATIONS

Ser. No. 676,085, Filed Mar. 27, 1991; Ser. No. 609,825, Filed Nov. 6, 1990; Ser. No. 591,722, Filed Oct. 2, 1990; Ser. No. 550,107, Filed Jul. 6, 1990; Ser. No. 540,879, Filed Jun. 20, 1990; Ser. No. 506,628, Filed Apr. 9, 1990; Ser. No. 282,285, Filed Dec. 9, 1988; Ser. No. 272,711, Filed Nov. 17, 1988.
(Ser. No. 591,722 is a continuation of Ser. No. 246,770, Filed Sep. 20, 1988).

Primary Examiner—Ernest G. Cusick
Assistant Examiner—Casey Jacyna
Attorney, Agent, or Firm—Harness, Dickey & Pierce

[57] ABSTRACT

An article carrying system for operative association with an automotive vehicle having an exterior generally horizontal surface, such as a trunk lid or roof, the system comprising a pair of elongated support members or slats which have a configuration which flows conformably and aerodynamically into the surface of the vehicle and which are permanently secured to the vehicle. The support members have longitudinally extending channels for supporting adjustable and/or removable components of the system, including tie downs and cross members which components are also provided with aerodynamic designs compatible with the remainder of the system. Provision is also made for association of components of the system, such as cross members, to be fixedly located on the support members. An aerodynamic locking mechanism is also disclosed for use in selected adjustable and/or removable components of the system which includes a hidden actuation mechanism and a hooking action to lock the component to the support member or slat.

37 Claims, 4 Drawing Sheets

| | | | | | | |
|---|---|---|---|---|---|---|
| 4,239,139 | 12/1980 | Bott | 224/324 | 4,442,961 | 4/1984 | Bott ... 224/42.03 B |
| 4,261,496 | 4/1981 | Mareydt et al. | 224/321 | 4,448,375 | 5/1984 | Cronce ... 224/321 |
| 4,264,025 | 4/1981 | Ferguson et al. | 224/321 | 4,460,116 | 7/1984 | Bott ... 224/321 |
| 4,270,681 | 6/1981 | Ingram | 224/321 | 4,469,261 | 9/1984 | Stapleton et al. ... 224/321 |
| 4,274,568 | 6/1981 | Bott | 224/319 | 4,473,178 | 9/1984 | Bott ... 224/324 |
| 4,274,570 | 6/1981 | Bott | 224/324 | 4,487,348 | 12/1984 | Mareydt ... 224/321 |
| 4,277,009 | 7/1981 | Bott | 224/309 | 4,501,385 | 2/1985 | Bott ... 224/319 |
| 4,295,587 | 10/1981 | Bott | 224/321 | 4,516,709 | 5/1985 | Bott ... 224/315 |
| 4,323,182 | 4/1982 | Bott | 224/321 | 4,516,710 | 5/1985 | Bott ... 224/324 |
| 4,341,332 | 7/1982 | Kowalski et al. | 224/326 | 4,684,048 | 8/1987 | Bott ... 224/326 |
| 4,364,500 | 12/1982 | Bott | 224/321 | 4,754,905 | 7/1988 | Bott ... 224/326 |
| 4,406,386 | 9/1983 | Rasor et al. | 224/321 | 4,768,691 | 9/1988 | Stapleton ... 224/321 |
| 4,427,141 | 1/1984 | Bott | 224/326 | 4,877,168 | 10/1989 | Bott . |
| 4,431,123 | 2/1984 | Bott | 224/321 | 4,899,917 | 2/1990 | Bott ... 224/326 |
| 4,432,478 | 2/1984 | Bott | 224/321 | 4,967,945 | 11/1990 | Bott . |
| 4,433,804 | 2/1984 | Bott | 224/321 | 4,972,983 | 11/1990 | Bott . |
| 4,440,333 | 4/1984 | Bott | 224/324 | 4,982,886 | 1/1991 | Cucheran . |

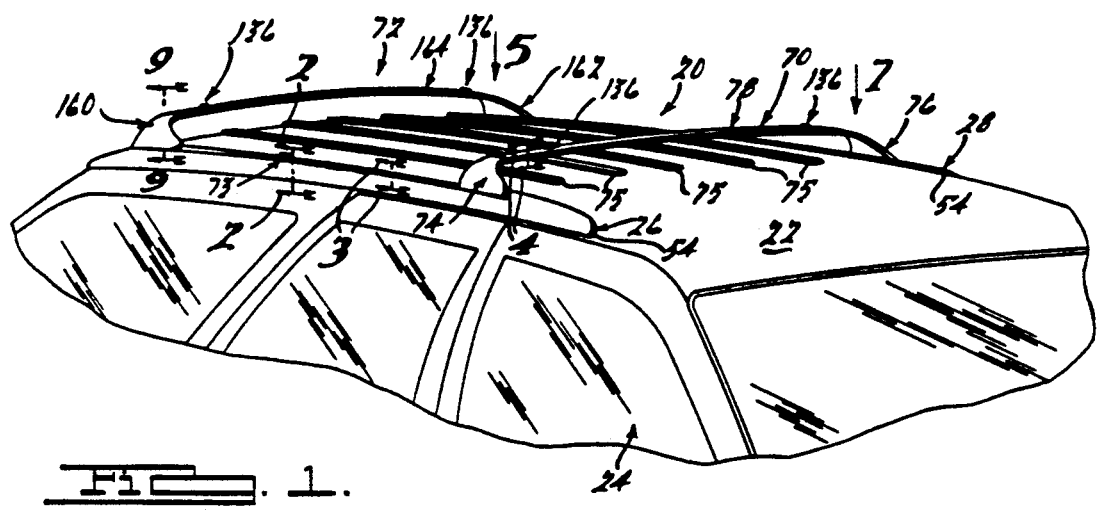
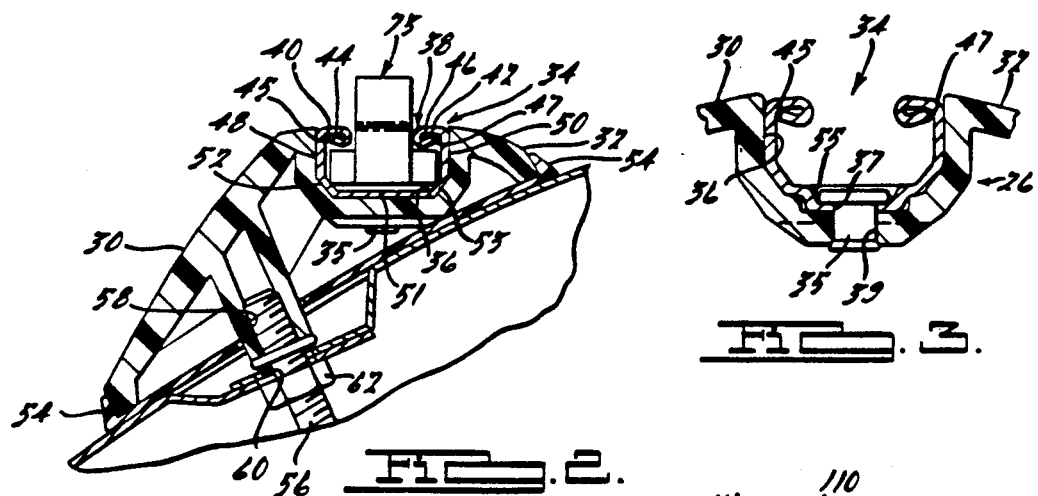
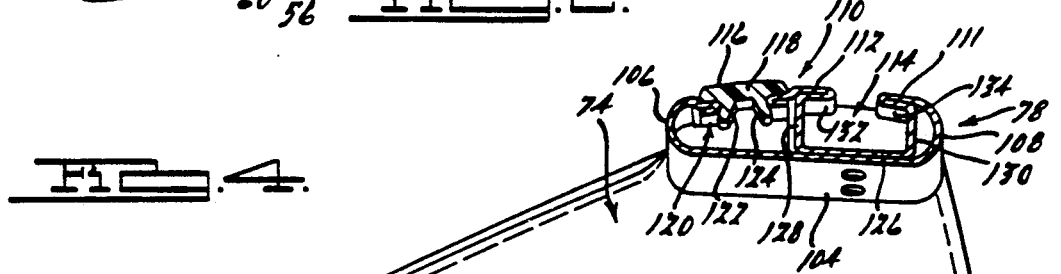
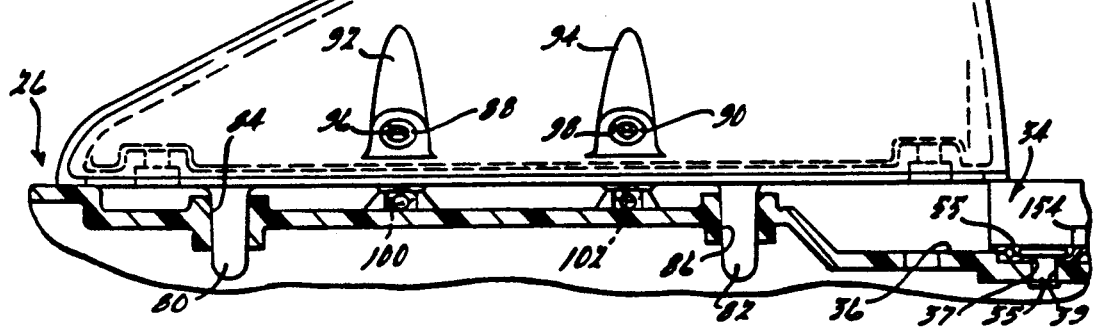

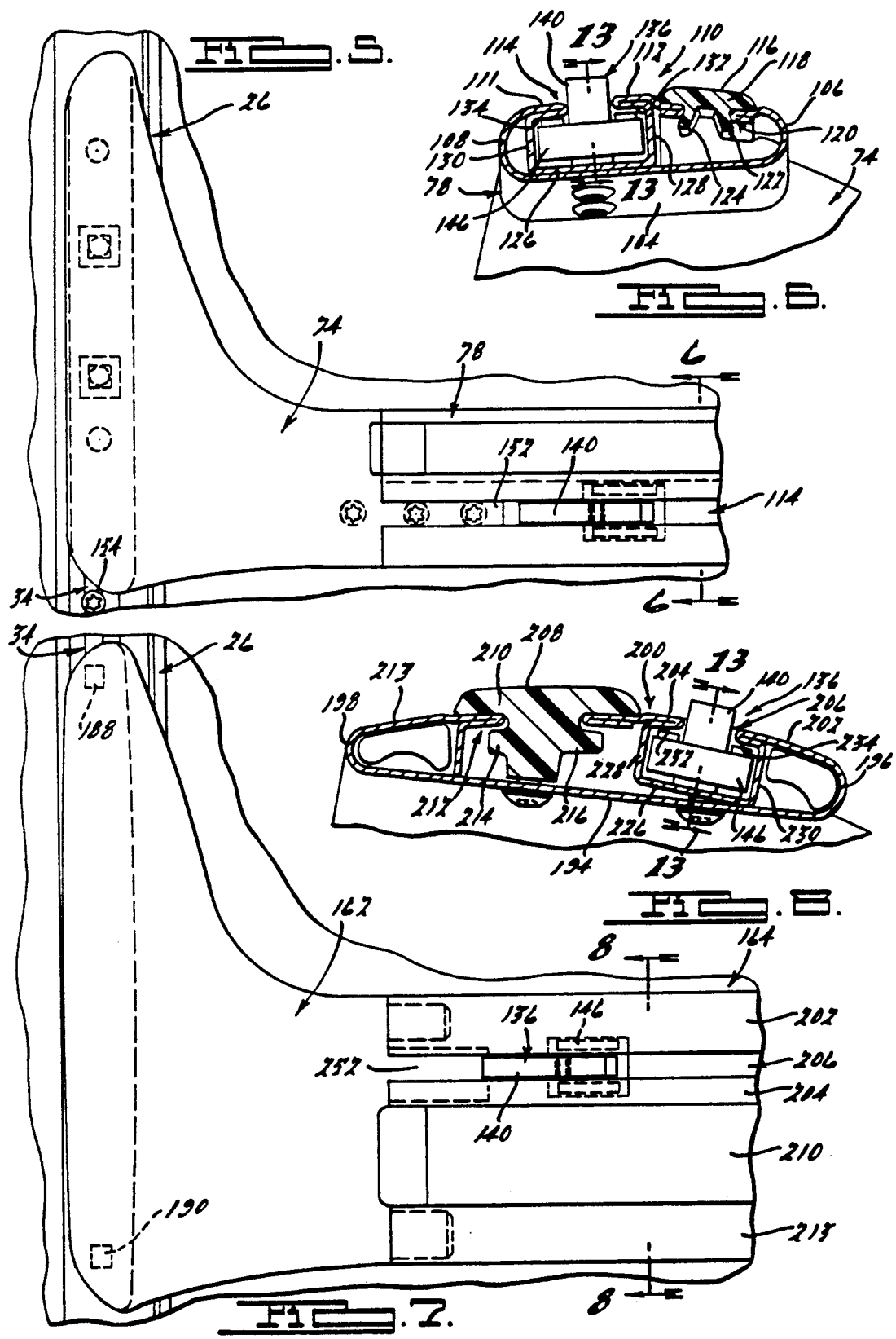

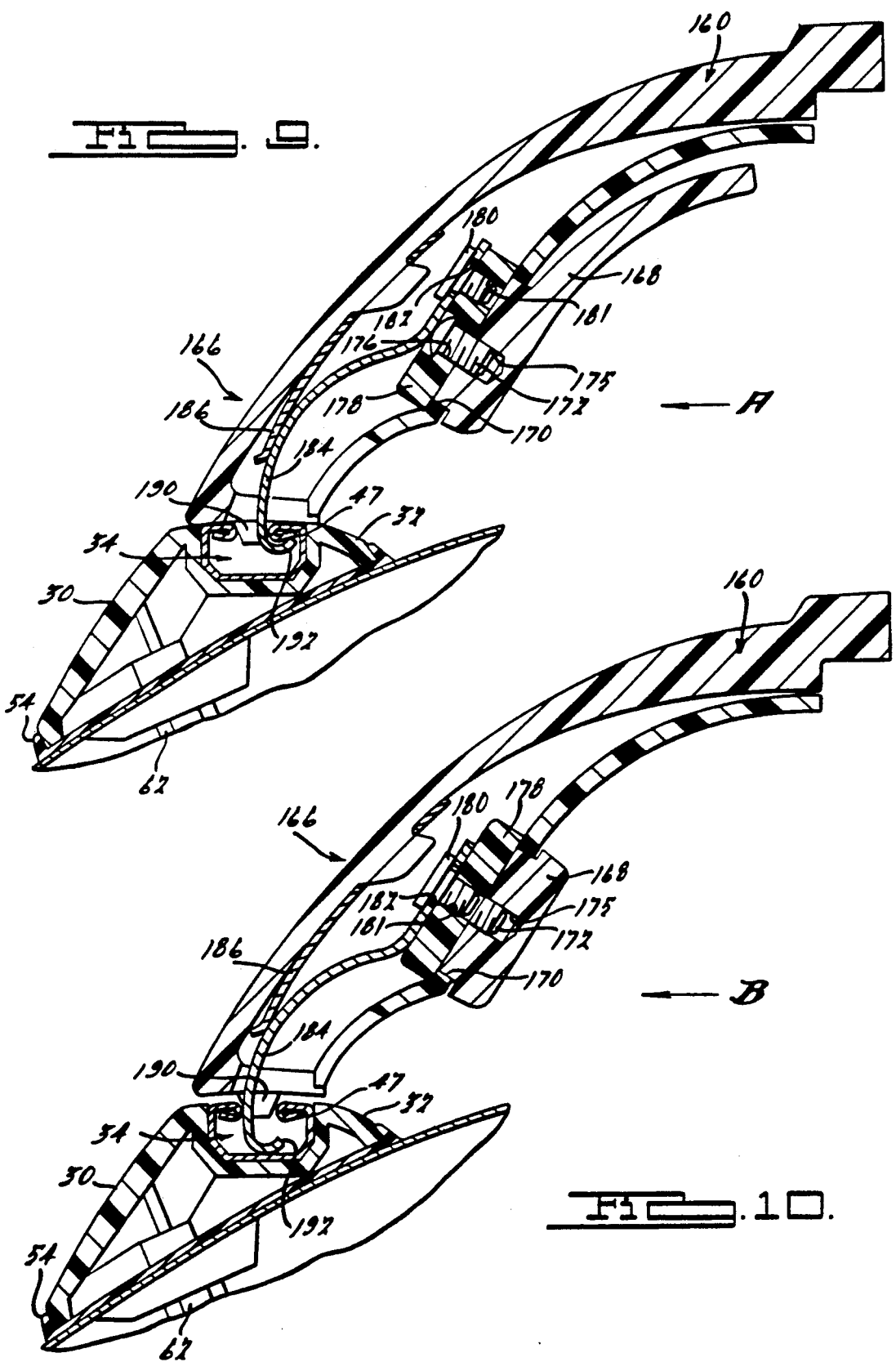

VEHICLE ARTICLE CARRIER

This is a continuation of U.S. patent application Ser. No. 07/407,635, filed Sep. 15, 1989, now abandoned, which is a continuation of U.S. patent application Ser. No. 07/213,899, filed Jun. 30, 1988, now U.S. Pat. No. 4,877,168, which is a continuation of Ser. No. 07/003,134, filed Jan. 14, 1987, now U.S. Pat. No. 4,754,905, which is a continuation of Ser. No. 06/778,385, filed Sep. 20, 1985, now U.S. Pat. No. 4,684,048.

BACKGROUND AND SUMMARY OF THE INVENTION

The present invention relates generally to vehicle article or luggage carriers and more particularly to a new and improved vehicle luggage carrier of the type shown in applicant's U.S. Pat. No. 4,099,658, issued Jul. 11, 1978. Generally, the article carrier of the present invention is of the type which comprises two or more slat-type elements which are fixedly secured to an exterior horizontal surface of an automotive vehicle, such as a vehicle roof or a trunk lid, and which are permanently attached to that surface and adapted to have ancillary article constraining members removably and/or adjustably secured thereto and includes a system of adjustable and fixed components which cooperate with one another and which may be removable in some instances.

The present invention has as one principal object to provide a luggage rack with slidably adjustable and fixedly engageable components including slidably adjustable cross members having tie downs for boxes, luggage, and the like associated with the cross members. The cross members and tie downs of the present invention are not only adjustable but also may be either removable from the luggage carrier or stored within other components of the luggage carrier substantially out of view. Each cross member may include at least one tie down and/or abutment member for optimum securement of articles or luggage to the article carrier and thereby the vehicle.

A significant advantage of the article carrier of the present invention is that the article carrier has a low profile when not in use with minimal structure projecting above the plane of the vehicle surface to which the article carrier is attached, thereby minimizing any adverse wind noise or fuel economy effects that would exist with any portion of the carrier being substantially vertically elevated.

The present invention further incorporates all of the aesthetically appealing features and the myriad of functional features and optional accessories disclosed in the slat-type luggage carriers of applicant's prior patents, such as that described in U.S. Pat. No. 4,099,658, referenced above.

Even more notably, the present invention elevates the aerodynamic design of a vehicle article carrier system having adjustable and/or removable components to an improved design not previously attained by any prior art carriers. The elongated support member or slat of the present invention providing the foundation of the carrier has surfaces which not only flow into and integrate with the surface of the vehicle, but also includes a channel along which components may be adjusted and/or removably attached.

In cooperation with this improved support member or slat, a new and improved locking mechanism for attaching the adjustable and/or removable components of the system to the member or slat is included having an aerodynamic, hidden release element.

Additional advantages are provided in the combination of the above features with other fixed components of an article carrier system and an improved cross member construction integrating adjustable tie down and/or abutment elements disposeable out of view, similar to those described in applicant's U.S. Pat. No. 4,460,116, issued Jul. 17, 1984, and further integrating a pad construction in a cross rail spaced from a functional channel on load bearing cross members for a more stable yet cushioned load bearing support for articles disposed on the cross members.

Other objects and advantages of the present invention will become apparent from the following detailed description taken in conjunction with the following drawings.

BRIEF DESCRIPTION OF THE DRAWINGS

FIG. 1 is a fragmentary perspective view of an automobile showing an article carrier mounted thereon which is constructed in accordance with the principles of the present invention;

FIG. 2 is an enlarged sectional view of the support member portion of the structure illustrated in FIG. 1 taken along the line 2—2 thereof;

FIG. 3 is an enlarged sectional view of the support member portion of the structure illustrated in FIG. 1 taken along the line 3—3 thereof;

FIG. 4 is an enlarged sectional view of one of the front stanchion portions of the structure of FIG. 1 taken along the line 4—4 thereof;

FIG. 5 is an elevated enlarged fragmentary view of one of the front stanchion assemblies of FIG. 1 taken in the direction of arrow 5.

FIG. 6 is a cross-sectional view of the cross rail portion of FIG. 5 taken along the line 6—6 of FIG. 5;

FIG. 7 is an elevated enlarged fragmentary view of one of the rear stanchion portions of the structure of FIG. 1 taken in the direction of arrow 7;

FIG. 8 is a cross-sectional view of the cross rail portion of FIG. 7 taken along the line 8—8 of FIG. 7;

FIG. 9 is a cross-sectional view of the rear stanchion of FIG. 7 locked to the base support member or slat of FIG. 1;

FIG. 10 is a cross-sectional view similar to FIG. 9 of the rear stanchion of FIG. 7 released from the base support member or slat of FIG. 1;

DETAILED DESCRIPTION OF THE PREFERRED EMBODIMENTS

Figure 11:
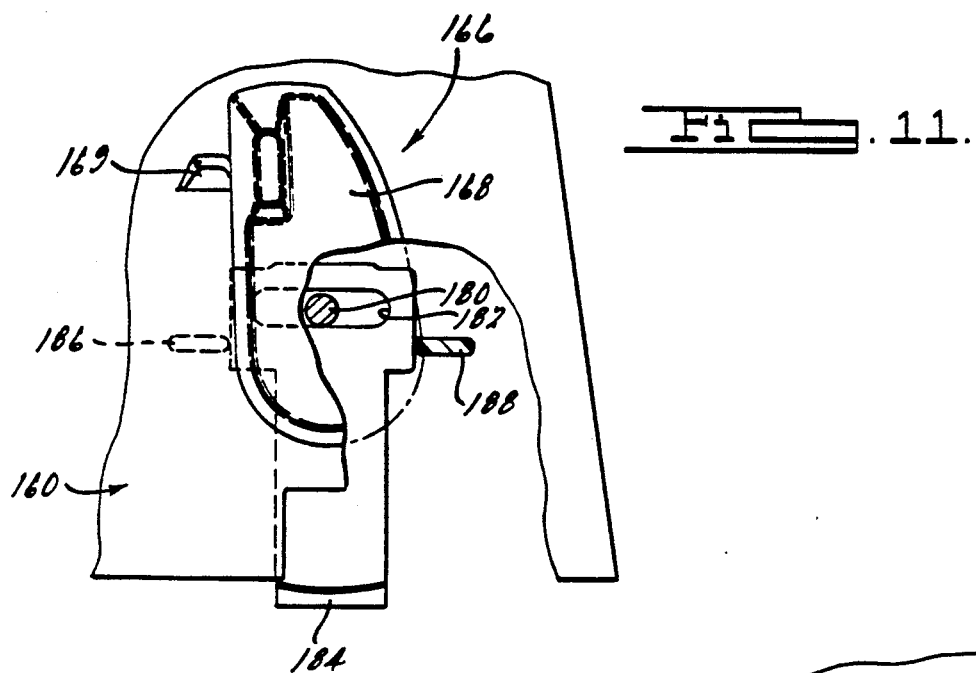
FIG. 11 is a view similar to FIG. 4 of the rear stanchion of FIG. 9 looking in the direction of arrow A in FIG. 9 having portions broken away.

Referring now in detail to FIG. 1 of the drawings, a vehicle luggage carrier 20 is shown in operative association with a generally horizontally disposed roof 22 of a typical automotive vehicle 24. Generally speaking, the luggage carrier 20 comprises a pair of laterally spaced, longitudinally extending support members or slats 26 and 28 which are secured upon the roof 22 at positions adjacent the lateral sides or edges thereof. In the embodiment illustrated, the members 26 and 28 are disposed over the seam where the roof 22 meets the remainder of the body portion of the vehicle, where the roof 22 has a downward curvature, which places the members 26 and 28 adjacent the horizontally extending surface portion of the roof 22. The members 26 and 28 have an external surface configuration that flows aerodynamically and smoothly in the surface of the vehicle 24.

Intermediate portions of the member 26 (or 28) are illustrated in cross-section in FIGS. 2 and 3. The member 26 comprises first 30 and second 32 exterior surfaces having an elongated channel 34 between the surfaces. The channel 34 comprises an elongated recess 36 and a liner 38 disposed in said recess 36 by means of, with reference to FIG. 3, fasteners 35 set through bores 37 in the liner and bores 39 in the recess 36. The liner 38 has upper article supporting surfaces 40, 42 disposed on a pair of inwardly directed upper flanges 44, 46, a pair of sidewalls 48, 50 extending downwardly therefrom, and a base 51 extending between the walls 48, 50 and integrated with the walls 48 and 50 via walls 52 and 53, respectively. The upper flanges 44, 46 are rolled back as illustrated in FIGS. 2 and 3 to provide grooves 45 and 47 in the interior of the channel 34 for the purposes as will be described below. The fasteners 35 are set below the surface of the base 51 by placement in recesses 55, as shown in FIGS. 3 and 4.

Referring to FIG. 2, a pad 54 is disposed between each of the members 26 and 28 and the roof 22. Each member 26 or 28 is secured to the roof 22 by a plurality of threaded collar studs 56 threadably engaged to the member 26 or 28 within a bore 58 and engaged with the roof 22 at the interior of the roof 22 through a plurality of holes 60 in the roof by means of a plurality of nuts 62. The studs 56 engage the members 26 and 28 at the plurality of bores 58 by augering into the members 26 and 28, which are plastic in the preferred embodiment, or by other conventional means. In this manner, the studs 56 are all hidden from view when the members 26 and 28 are assembled on the vehicle.

The article carrier 20 of FIG. 1 further comprises a pair of transversely or laterally extending cross member assemblies 70 and 72 and may also include a tie down 73 and a plurality of intermediate supporting slats 75. The front cross member assembly 70 comprises a pair of stanchions 74 and 76 telescopically engaged with and secured to a front cross rail 78. Referring to FIG. 4, the stanchion 74 (and likewise 76) is fixedly secured to the support member 26 (and 28) via two posts 80 and 82 which fit into two bores 84 and 86 at the front portion of each of the members 26 and 28 and via two bolts 88 and 90 fitting through recesses 92 and 94 and apertures 96 and 98 in each of the stanchions 74 and 76 into corresponding threaded bores 100 and 102 in the members 26 and 28.

The stanchions 74 and 76 have an aerodynamically streamlined curvature as illustrated in FIGS. 1, 4, and 5 and telescopically engage the front cross rail 78 in a similarly aerodynamically streamlined manner. Referring to FIGS. 4 and 6, the cross rail 78 comprises a bottom surface 104 from which a curved leading surface 106 and a curved trailing surface 108 extend upwardly. The upper surface 110 of the cross rail 78 comprises a series of elongated article supporting surfaces including surfaces 111 and 112 disposed one on each side of an elongated first channel 114 and a surface 116 disposed on an elongated front bumper 118 set into a second channel 120 in the rail 78. The bumper 118 has a pair of elongated flanges 122 and 124 on the underside thereof to secure the bumper in the second channel 120.

Figure 13:
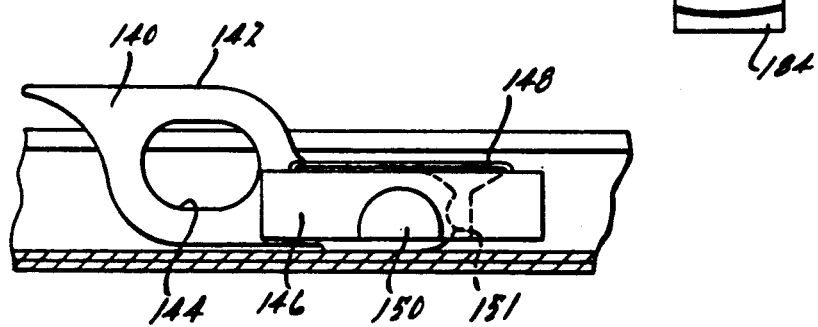
FIG. 13 is a vertical sectional view of either FIG. 6 or FIG. 8 along the line 13—13 of either view of the tie down disposed in the cross rail of either view.

Referring to FIGS. 4 and 6, the first channel 114 has an interior cross-section having a base 126, a pair of sidewalls 128 and 130, and a pair of interior clamping surfaces 132 and 134. Within the first channel 114 (FIG. 6) is disposed a tie down/positioning member 136 similar to that disclosed in applicant's U.S. Pat. No. 4,460,116, issued Jul. 17, 1984. The tie down/positioning member 136 (FIGS. 6 and 13) is comprised of an upper section 140 having a vertically disposeable abutment surface 142 and an aperture 144 therein, a base portion 146 including spring biasing members 148, and a pivot 150 for pivotably associating the upper section 140 with the base portion 146. The upper section 140 also includes a lower cam member 151 on the opposite side of the pivot 150 which engages the base 126 of the first channel 114 with pivotal movement of the upper section 140 from the horizontal to the vertical and clamps the biasing members 148 against the clamping surfaces 132 and 134 and lock the tie down/positioning member 136 in any selected position along the length of the first channel 114. The ends of the channel 114 also include an abutment 152 (FIG. 5) to aid in disposing the upper section 140 from the horizontal to the vertical.

Figure 12:
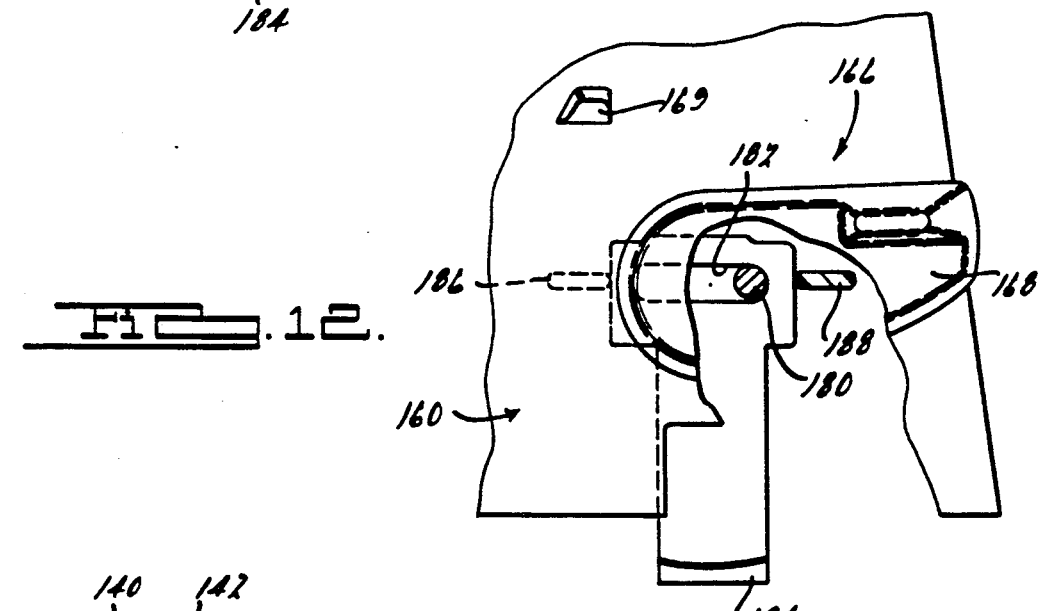
FIG. 12 is a view similar to FIG. 11 of the rear stanchion of FIG. 10 looking in the direction of arrow B in FIG. 10 having portions broken away.

The rear cross member assembly 72 is adjustable to any selected position along the length of the members 26 and 28, as determined by a stop 154 (FIGS. 4 and 5) or by the end of the channel 34, and may also be removed, if desired. The assembly 72 (FIGS. 1 and 7) comprises a pair of stanchions 160 and 162 telescopically engaged with and secured to a rear cross rail 164. The stanchions 160 and 162 each engage a corresponding support member 26 or 28 at the channel 34 thereof via a locking mechanism 166 (FIGS. 9 through 12). The locking mechanism 166 comprises a pivoted lever 168 mounted to each stanchion 160 or 162 within a recess 170 and secured to a pin 172. The lever 168 is limited in movement by a stop 169 (FIG. 11) to indicate a vertically disposed position for the lever 168. The pin 172 threadably engages the lever 168 in a bore 175 and communicates with the interior 174 of the stanchion and engages an eccentric member 178 disposed in the stanchion interior 174 via a bore 176 at a position offset from the center of the member 178 to eccentrically move a pin 180 mounted on the member 178 at bore 181. Referring to FIGS. 11 and 12, the pin 180 moves within a yoke 182 which is integrated with a hook 184. Guides 186 and 188 may be disposed one on each side of the yoke 182 to stabilize the linear vertical movement of the hook 184. The hook 184 is formed with a curvature to permit some resiliency. Further tension is applied to the hook 184 by a tensioning member 186 fixedly disposed adjacent the path of movement of the hook 184 as illustrated in FIGS. 9 and 10.

In operation, the stanchion 160 or 162 is placed over the channel 34 of the support member or slat 26 and the hook 184 is placed within the channel 34. The stanchion 160 or 162 also includes front and rear alignment posts 188 and 190 (FIG. 7) which are also placed within the channel 34 as the stanchion is set upon the upper surfaces 40 and 42 of the member 26 or 28. Once alignment is attained, the lever 168 is rotated from a horizontally disposed position (FIG. 10) to a vertically disposed position (FIG. 9) abutting against the stop 169 and lifting the hook 184 so that its leading edge 192 is engaged with the groove 47 of the channel 34 to clamp the stanchion 160 or 162 to the support member or slat 26. The return of the lever 168 to a horizontal disposition releases the hook 184 and the stanchion 160 or 162 from the member or slat 26 for adjustment or removal.

Referring to FIGS. 7 and 8, the rear cross rail 164 is similar to the front cross rail 78 in that it has a bottom surface 194 from which a curved leading surface 196 and a curved trailing surface 198 extend upwardly. It should be noted that the leading surface 196 and trailing surface 198 may be reversed, however, depending upon the selected placement of the rear cross rail assembly 72 on the members 26 and 28. The upper surface 200 of the cross rail 164 comprises a series of elongated article supporting surfaces including surfaces 202 and 204 disposed one on each side of an elongated first channel 206, a surface 208 disposed on an elongated front bumper 210 set into a second channel 212 in the rail 78 and an additional surface 213. The bumper 210 has a pair of elongated flanges 214 and 216 on the underside thereof to secure the bumper in the second channel 212.

Referring to FIG. 8, the first channel 212 has an interior cross-section having a base 226, a pair of sidewalls 228 and 230, and a pair of clamping surfaces 232 and 234. Within the first channel 212 is disposed a tie down/positioning member 136 again similar to that disclosed in applicant's U.S. Pat. No. 4,460,116, issued Jul. 17, 1984. The tie down/positioning member 136 is again comprised of an upper section 140 having a vertically disposeable abutment surface 142 and an aperture 144 therein, a base portion 146 including spring biasing members 148, and a pivot 150 for pivotably associating the upper section 140 with the base portion 146. The upper section 140 also includes a lower cam member on the opposite side of the pivot 150 which engages the base 226 of the first channel 212 with pivotal movement of the upper section 140 from the horizontal to the vertical and clamp the biasing members 148 against the clamping surfaces 232 and 234 and lock the tie down/positioning member 136 in any selected position along the length of the first channel 212. The ends of the channel 212 also include an abutment 252 (FIG. 7) to aid in disposing the upper section 140 from the horizontal to the vertical.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. An article carrier adapted to be secured to a motor vehicle adjacent to a generally horizontally extending body surface on said vehicle, comprising:
   a pair of elongated support members adapted to be secured to said vehicle,
   each said support member having a bottom portion adapted to be disposed in generally facing relation toward the surface of the vehicle body surface, an upper and outer side portion curving gradually upwardly and inwardly in diverging relation to said bottom portion, and an elongated channel opening in a plane generally parallel to a vertical plane and extending longitudinally along a length of said support member and spaced from said upper and outer side portion, wherein said channel is offset from a longitudinal centerline of said support member and includes a flange, and a locking portion;
   at least one cross member having two end portions; and
   locking means associated with said cross member for releasably locking said cross member in a selected position on each said support member, said locking means having a housing with a lower surface, an outside surface and an inside surface spaced transversely from said outside surface;
   said locking means including a member extending therefrom and actuating means associated with said member for moving said member generally linearly inwardly and outwardly of said locking means such that said member releasably engages said locking portion of said support member and releasably secures said locking means at a desired position along said support members.

2. The article carrier of claim 1, wherein each said locking means further comprises guide means protruding at least partially into its respective channel when said locking means is disposed on its respective support member to enable each said locking means and said cross member to be slidably, longitudinally positioned along said support members without first removing each said locking means from its respective support member.

3. The article carrier of claim 2, wherein said member is moved generally linearly out of locking engagement with said locking portion of said support member when said actuating member is manually urged towards said vehicle body surface.

4. The article carrier of claim 2, wherein said member moves generally linearly into locking engagement with said locking portion as said actuating member moves away from said vehicle body surface.

5. The article carrier of claim 1, wherein said actuating means comprises:
   an actuating assembly operatively associated with said member for moving said member generally linearly into and out of engagement with said locking portion of said support member; and
   a manually movable actuating member operatively associated with said actuating assembly for controllably causing said actuating assembly to move said member generally linearly into and out of locking engagement with said locking portion of said support member.

6. The article carrier of claim 5, wherein said actuating assembly includes means for enabling said actuating member to move pivotally towards and away from said vehicle body surface.

7. The article carrier of claim 6, wherein said actuating assembly is coupled to said member such that pivotal movement of said actuating member causes generally linear inward and outward movement of said member.

8. The article carrier of claim 7, wherein said actuating member moves pivotally in a plane generally parallel to a plane within which said member moves.

9. The article carrier of claim 1, further comprising a mounting pad disposed in between said bottom portion of at least one of said support members and said vehicle body surface.

10. An article carrier adapted to be secured to a motor vehicle adjacent a generally horizontally extending body surface on the vehicle, comprising:

a pair of elongated support members adapted to be secured to the vehicle surface, each said support member having a bottom portion adapted to be disposed in generally facing relation toward the surface of the vehicle body surface and an upper and outer side portion curving gradually upwardly and inwardly in diverging relation to said bottom portion and aerodynamically conforming to the adjacent surfaces of the vehicle, each support member further having a locking portion and an elongated, vertically oriented channel extending longitudinally on each of said support members and spaced from said upper and outer side portion, wherein said channel is offset from a longitudinal centerline of said support member, at least one cross member; and a plurality of locking means secured to opposing end portions of said cross member and disposed on said support members for locking said cross member at a selected position along each said support member, each said locking means having a housing with a lower surface, an outside surface and an inside surface spaced transversely from said outside surface and a first end portion mounted to one end of said cross member and a second end portion releasably engageable with a corresponding one of said locking portions;

each said locking means further including a generally linearly extendable and retractable locking member projecting into engagement with its associated locking portion and engageable with said locking portion for releasably securing said cross member at a selected position along said support members, and actuating means associated with each said locking member for urging said locking members generally linearly towards and away from said support members such that each said locking member releasably engages said locking portion of its associated support member to thereby secure said cross member at said selected position; and each said locking means including guide means protruding at least partially into said channel when said locking means is disposed on said support members to enable each said locking means and said cross member to be slidably, longitudinally positioned along said support members without first removing each said locking means from its associated support member.

11. The article carrier of claim 10, wherein said actuating means comprises:

an actuating assembly operatively associated with said locking member for moving said member generally linearly into and out of engagement with said locking portion of said support member; and a manually movable actuating member operatively associated with said actuator assembly for controllably causing said actuating assembly to move said locking member.

12. The article carrier of claim 11, wherein said locking member moves generally linearly into locking engagement with said locking portion as said actuating member moves away from said vehicle body surface.

13. The article carrier of claim 11, wherein said actuating assembly includes means for enabling said actuating member to move pivotally towards and away from said vehicle body surface.

14. The article carrier of claim 13, wherein said actuating assembly is coupled to said locking member such that pivotal movement of said actuating member causes said generally linear inward and outward movement of said locking member.

15. The article carrier of claim 14, wherein said locking member is moved generally linearly out of locking engagement with said locking portion of said support member when said actuating member is urged manually towards said vehicle body surface.

16. The article carrier of claim 10, wherein said member is moved generally linearly out of locking engagement with said locking portion of said support member when said actuating member is manually urged towards said vehicle body surface.

17. The article carrier of claim 10, wherein said member is urged generally linearly into locking engagement with said locking portion as said actuating member moves away from said vehicle body surface.

18. An article carrier system adapted to be secured to a motor vehicle adjacent a generally horizontally extending body surface on said vehicle, comprising:

at least one adjustable article securing member having first locking means;

at least one fixed article securing member;

a pair of elongated support members adapted to be secured to said vehicle, said support members each having a bottom portion adapted to be disposed in generally facing relation toward the surface of the vehicle body surface, an upper and outer side portion curving gradually upwardly and inwardly in diverging relation to said bottom portion, at least one upper article supporting surface, an elongated channel opening in a plane generally parallel to a vertical plane and extending longitudinally on each of said support members and spaced from said upper and outer side portion, wherein said channel is offset from a longitudinal centerline of said support member, and second locking means extending longitudinally within said channel and toward each other and cooperable with said first locking means for releasably locking said adjustable article securing member in a selected position on each support member, said fixed and adjustable article securing members being cooperable to secure articles on said vehicle, said first locking means disposed entirely on said adjustable article securing member, said first locking means having a housing with a lower surface, an outside surface and an inside surface spaced transversely from said outside surface by said lower surface and a first portion mounted to one end portion of said cross member and a second portion removably engaged with the corresponding channel of one of said corresponding support members, said first locking means including a hook extending from said second end portion and projecting into said channel to lock the adjustable article securing member to said support member, an actuating element disposed on said housing for moving said hook linearly toward and away from said second end portion such that said hook engages one of said second locking means and forces said lower surface of said housing against said support member.

19. In combination in a luggage carrier adapted to be operatively disposed on an automotive vehicle, a vehicle article carrier apparatus comprising;

a pair of laterally spaced, longitudinally extending article securing assemblies adapted to be fixedly secured to an exterior body surface of the vehicle;

at least one cross member spaced vertically above said article securing assemblies and extending generally laterally therebetween;

a pair of support members arranged one at each end of said cross member and adapted to be longitudinally, slidably adjustably secured to said article securing assemblies, whereby said cross member may be selectively longitudinally positioned along said article securing assemblies;

said article securing assemblies each having a bottom portion adapted to be disposed in generally facing relation toward the body surface, an upper and outer side portion curving gradually upwardly and inwardly in diverging relation to said bottom portion and a channel opening in a plane generally parallel to a vertical plane and spaced from said upper and outer side portion, said channel being offset from a longitudinal centerline of said article securing assemblies, said channel including at least one flange portion to define a surface adapted to at least partially help secure said cross member thereto;

each of said support members also having a bottom portion adapted to be disposed on a respective one of said article securing assemblies and an outer side portion having an arcuate, outwardly facing surface curving gradually upwardly and inwardly in diverging relation to said bottom portion and juxtaposed with said upper and outer side portion of its respective article securing assembly; and each of said support members including linearly extendable and retractable locking means for engaging with a portion of said support member;

actuating means movable manually towards and away from said exterior surface of said vehicle for urging said locking means in a generally linear fashion between engaged and disengaged positions, said locking means assuming said disengaged position as said actuating means is moved towards said exterior surface of said vehicle and said engaged position as said actuating means is moved away from said exterior surface of said vehicle;

each said locking means further including guide means extending at least partially within said channel for guiding said locking means slidably, longitudinally along said channel to thereby enable said article securing assemblies to be slidably, adjustably positioned along said support members without first being removed from said support members;

whereby the arcuate shaped outwardly facing surfaces of said side portions of said support members and said upper and outer side portion of each said article securing assembly have a relatively smooth blended continuous appearance.

20. The vehicle article carrier apparatus of claim 19, wherein said actuating means comprises:
an actuating assembly operatively associated with said locking means for moving said locking means generally linearly into and out of engagement with said portion of said support member; and
a manually movable actuating member operatively associated with said actuating assembly for controllably causing said actuating assembly to move said locking means.

21. The vehicle article carrier apparatus of claim 19, further comprising a mounting pad disposed in between said bottom portion of at least one of said support members and said vehicle body surface.

22. An article carrier adapted to be secured to a motor vehicle adjacent a generally horizontally extending body surface on said vehicle comprising:
a pair of elongated support assemblies adapted to be secured to said vehicle, said support assemblies having a bottom portion adapted to be disposed in generally facing relation toward the surface of the vehicle body surface and an upper and outer side portion curving gradually upwardly and inwardly in diverging relation to said bottom portion and an elongated, vertically oriented channel extending longitudinally on each of said support assemblies and spaced from said upper and outer side portion, wherein said channel is offset from a longitudinal centerline of each of said support assemblies;
at least one cross member having two end portions;
means on at least one of said end portions for locking said cross member in a selected position on one of said support assemblies, said locking means having a housing with a lower surface, an outside surface and an inside surface spaced transversely from said outside surface a relatively linearly extendable and retractable locking member, actuating means associated with said locking member for moving said locking member such that said locking member releasably engages one of said support assemblies, and guide means operable to protrude at least partially within said channel to guide said locking means slidably along said support assemblies as said locking means and cross member are slidably positioned along said support assemblies.

23. An article carrier adapted to be secured to a motor vehicle adjacent a generally horizontally extending body surface on said vehicle, said article carrier comprising:
a pair of elongated support members adapted to be secured to said generally horizontally extending body surface on said vehicle,
each said support member having a bottom portion adapted to be disposed in generally facing relation toward said generally horizontally extending body surface, an upper and outer side portion curving gradually upwardly and inwardly in diverging relation to said bottom portion, and at least one upper article supporting surface; a locking portion; and an elongated channel extending longitudinally along a length of said support member and spaced from said upper and outer side portion, said channel being offset from a longitudinal centerline of said support member, said channel including at least one flange;
at least one cross member having two end portions; and
a pair of locking means for locking said cross member in a selected position on each said support member;
each said locking means having a housing with a lower surface, and an outer side portion having an arcuate, outwardly facing surface curving gradually upwardly and inwardly in diverging relation to said bottom portion, and an inside surface spaced transversely from said outer side portion by said lower surface;
said locking means further having a generally linearly extensible and retractable locking member adapted to cooperatively engage said locking portion of an associated one of said support members to thereby secure said cross member at said selected position;

said locking means further including guide means adapted to protrude into said channel for guiding said locking means and its associated cross members as said locking means and said associated cross member are moved longitudinally along said support member.

24. The article carrier of claim 23, further comprising a pair of mounting pad means disposed between said bottom portions of said support members and said body surface on said vehicle for facilitating mounting of said support assemblies on said body surface.

25. The article carrier of claim 24, wherein each said mounting pad means comprises a base portion and a lip portion extending generally transversely of said base portion, said lip portion and said upper and outer side portion of each said support member forming a generally smooth, continuous curvature.

26. The article carrier of claim 25, wherein each said lip portion includes an inner surface portion which abuts a portion of said upper and outer side portions of each said support member.

27. An article carrier adapted to be secured to a motor vehicle adjacent a generally horizontally extending body surface on said vehicle, said article carrier comprising:

a pair of elongated support members adapted to be secured to said generally horizontally extending body surface on said vehicle, each said support member having a bottom portion adapted to be disposed in a generally facing relation toward said generally horizontally extending body surface, an upper and outer side portion curving gradually upwardly and inwardly in diverging relation to said bottom portion; a locking portion; and an elongated channel extending longitudinally along a length of said support member and spaced apart from said upper and outer side portion, said channel being offset from a longitudinal centerline of said support member, said channel including at least one flange;

at least one cross member having two end portions; and a pair of locking means for locking said cross member in a selected position on each said support member;

each said locking means having a housing with a lower surface, and an outer side portion having an arcuate, outwardly facing surface curving gradually upwardly and inwardly in diverging relation to said support member bottom portion when disposed on said support member, and an inside surface spaced transversely from said outer side portion;

said locking means further having a generally linearly extendable and retractable locking member adapted to cooperatively engage said locking portion of an associated one of said support members to thereby secure said cross member at said selected position;

said locking means further including guide means adapted to protrude into said channel for guiding said locking means and its associated cross member as said locking means and said associated cross member are moved longitudinally along said support member.

28. The article carrier of claim 27, further comprising actuating means associated with each said support member for urging said locking member generally linearly inwardly and outwardly of said locking portion.

29. The article carrier of claim 27, further comprising a mounting pad disposed in between said bottom portion of at least one of said support members and said vehicle body surface.

30. An article carrier adapted to be secured to a motor vehicle adjacent a generally horizontally extending body surface on said vehicle, said article carrier comprising:

a pair of elongated support members adapted to be secured to said generally horizontally extending body surface on said vehicle, each said support member having a bottom portion adapted to be disposed in a generally facing relation toward said generally horizontally extending body surface, an upper and outer side portion curving gradually upwardly and inwardly in diverging relation to said bottom portion; a locking portion; and an elongated channel extending longitudinally along a length of said support member and spaced apart from said upper and outer side portion, said channel being offset from a longitudinal centerline of said support member, said channel including at least one flange;

at least one cross member having two end portions; and a pair of locking means for locking said cross member in a selected position on each said support member;

each said locking means having a housing with a lower surface, and an outer side portion having an arcuate, outwardly facing surface curving gradually upwardly and inwardly in diverging relation to said support member bottom portion when disposed on said support member, and an inside surface spaced transversely from said outer side portion;

said locking means further having a generally linearly extendable and retractable locking member adapted to cooperatively engage said locking portion of an associated one of said support members to thereby secure said cross member at said selected position, and actuating means movable towards and away from said body surface of said vehicle for moving said locking means between extended and retracted positions;

said locking means further including guide means adapted to protrude into said channel for guiding said locking means and its associated cross members as said locking means and said associated cross member are moved longitudinally along said support member.

31. The article carrier of claim 30, wherein said actuating means comprises:

an actuating assembly operatively associated with said member for urging said locking member generally linearly into and out of engagement with said locking portion of said support member; and a manually movable actuating member operatively associated with said actuating assembly for controllably causing said actuating assembly to move said locking member.

32. The article carrier of claim 31, wherein said actuating assembly includes means for enabling said actuating member to move pivotally towards and away from said vehicle body surface.

33. The article carrier of claim 32, wherein said actuating assembly is coupled to said locking member such that pivotal movement of said actuating member causes said generally linear inward and outward movement of said locking member.

34. The article carrier of claim 30, further comprising a mounting pad disposed in between said bottom portion of at least one of said support members and said vehicle body surface.

35. An article carrier adapted to be secured to a motor vehicle adjacent to a generally horizontally extending body surface on said vehicle, comprising:

a pair of elongated support members adapted to be secured to said vehicle;

a support member having a bottom portion adapted to be disposed in generally facing relation toward the surface of the vehicle body surface, an upper and outer side portion curving gradually upwardly and inwardly in diverging relation to said bottom portion, and an elongated channel extending longitudinally along a length of said support member and spaced from said upper and outer side portion, wherein said channel is offset from a longitudinal centerline of said support member and includes a flange, and said support member further including a locking portion;

at least one cross member having two end portions; and locking means associated with said cross member for releasably locking said cross member in a selected position on each said support member, said locking means having a housing with a lower surface, an outside surface and an inside surface spaced transversely from said outside surface;

said locking means including a locking member extending therefrom and actuating means associated with said locking member for moving said locking member generally linearly inwardly and outwardly of said locking means such that said locking member releasably engages said locking portion of said support member and releasably secures said locking means at a desired position along said support members; and each said locking means including guide means protruding at least partially into said channel when said locking means is disposed on said support members to enable each said locking means and said cross member to be slidably, longitudinally positioned along said support members without first removing each said locking means from its associated support member.

36. The article carrier of claim 35, wherein said channel comprises a generally upwardly opening channel.

37. The article carrier of claim 35, wherein said guide means protrudes outwardly of said locking means in a plane that is generally co-planar with said plane within which said channel opens.

* * * * *